(12) United States Patent
Kameda et al.

(10) Patent No.: US 11,202,015 B2
(45) Date of Patent: Dec. 14, 2021

(54) CONTROL APPARATUS AND CONTROL METHOD

(71) Applicant: CANON KABUSHIKI KAISHA, Tokyo (JP)

(72) Inventors: Jun Kameda, Tokyo (JP); Takuma Yanagisawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/880,658

(22) Filed: May 21, 2020

(65) Prior Publication Data

US 2020/0374467 A1 Nov. 26, 2020

(30) Foreign Application Priority Data

May 24, 2019 (JP) .............................. JP2019-097285

(51) Int. Cl.
*H04N 5/232* (2006.01)
*G06K 9/20* (2006.01)

(52) U.S. Cl.
CPC ....... *H04N 5/23299* (2018.08); *G06K 9/2054* (2013.01); *H04N 5/23219* (2013.01)

(58) Field of Classification Search
CPC ........................ H04N 5/23299; H04N 5/23219

USPC .......................................................... 348/77
See application file for complete search history.

(56) References Cited

U.S. PATENT DOCUMENTS

| | | | |
|---|---|---|---|
| 2015/0163434 A1* | 6/2015 | Ishibashi | H04N 5/3535 348/66 |
| 2016/0142645 A1* | 5/2016 | Shionoya | H04N 5/265 348/218.1 |
| 2020/0084387 A1* | 3/2020 | Baldwin | H04N 5/33 |

FOREIGN PATENT DOCUMENTS

JP        2005-338352 A        12/2005

* cited by examiner

*Primary Examiner* — Amir Shahnami
(74) *Attorney, Agent, or Firm* — Cowan, Liebowitz & Latman, P.C.

(57) ABSTRACT

A control apparatus includes at least one processor configured to perform operations as a detection unit configured to detect a specific area based on a signal imaged by an image sensor configured to provide a first imaging operation and a second imaging operation, and a selection unit configured to select an imaging timing of the second imaging operation based on the first imaging operation of the image sensor. The detection unit detects the specific area using the signal imaged at the imaging timing selected by the selection unit.

7 Claims, 13 Drawing Sheets

CONTROL APPARATUS AND CONTROL METHOD

BACKGROUND OF THE INVENTION

Field of the Invention

The present invention relates to an imaging apparatus that includes an image sensor configured to provide a plurality of imaging operations and controls a tracking frame during live-view imaging.

Description of the Related Art

There has conventionally been known an imaging apparatus that uses the same imaging result for an image signal used to display a live-view image and an image signal used to detect a tracking frame area. This configuration can sequentially update the display image while reading it out. However, the frame is detected using the readout result of the image signal for the frame display and thus the frame cannot be updated until the readout is completed. As a result, a shift or delay may occur between the image display and the frame display.

Japanese Patent Laid-Open No. ("JP") 2005-338352 discloses an autofocus system that provides a tracking image sensor in addition to a recording/imaging image sensor so that they can capture an object image in the same imaging range, and displays a tracking frame while detecting an object to be tracked using a video signal from the tracking image sensor.

However, JP 2005-338352 is silent about a temporal relationship between imaging of the image signal used to display the live-view image and imaging of an image signal for imaging and detections. Indeed, a delay or shift may occur depending on the processing times for storing and reading the video signal and for detecting the object.

SUMMARY OF THE INVENTION

The present invention provides a control apparatus and a control method, each of which can display a tracking area with a small delay or shift amount from display of a live-view image.

A control apparatus according to one aspect of the present invention includes at least one processor configured to perform operations as a detection unit configured to detect a specific area based on a signal imaged by an image sensor configured to provide a first imaging operation and a second imaging operation, and a selection unit configured to select an imaging timing of the second imaging operation based on the first imaging operation of the image sensor. The detection unit detects the specific area using the signal imaged at the imaging timing selected by the selection unit.

A control apparatus according to another aspect of the present invention includes at least one processor configured to perform operations as a detection unit configured to detect an object in an image based on a signal imaged by an image sensor configured to provide a first imaging operation and a second imaging operation, an image display unit configured to display an image by the first imaging operation, and an area display unit configured to display an object area detected by the detection unit. The detection unit detects an object using an image captured by the second imaging operation. The area display unit displays the object area detected using an image by an accumulation closest to exposure time in the first imaging operation, among images for which a detection by the detection unit is completed by time when a tracking target object is displayed by the image display unit.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
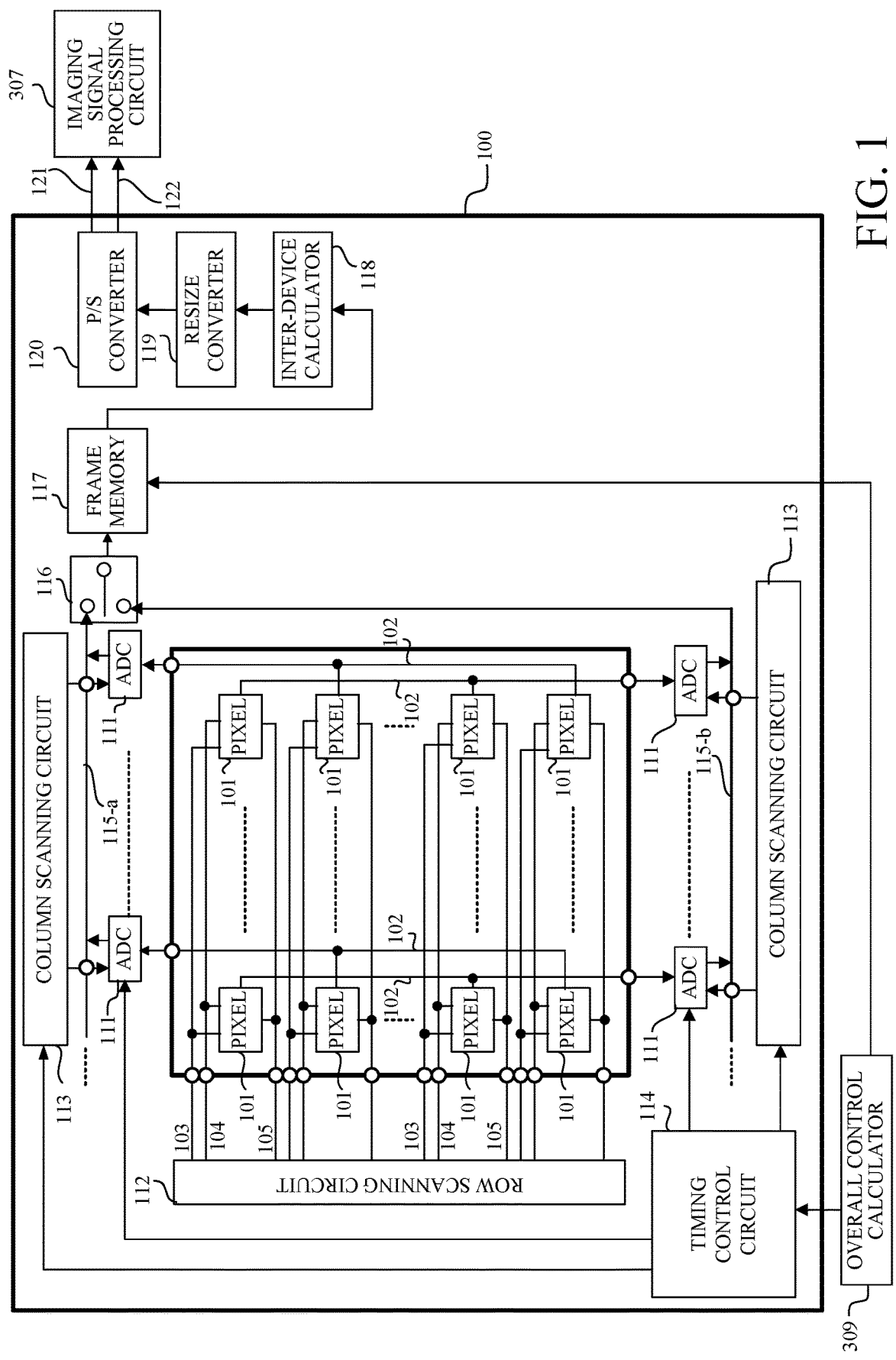
FIG. 1 is a configuration diagram of an image sensor according to each embodiment.

Referring now to FIG. 1, a description will be given of a configuration of an imaging apparatus according to a first embodiment of the present invention. FIG. 1 is a configuration diagram of an image sensor 100 as an image pickup element (imager) according to this embodiment.

The image sensor 100 has a plurality of pixels 101 arrayed in a matrix, and is connected to a transfer signal line 103, a reset signal line 104, and a row selecting signal line 105 in a horizontal direction (row direction) and to a vertical output line 102 in a vertical direction (column direction). Each vertical output line 102 has a different connection destination depending on the readout row unit.

The image sensor 100 includes a column ADC block 111, a row scanning circuit 112, a column scanning circuit 113, a timing controlling circuit (pixel driving circuit) 114, a switch 116, a frame memory 117, an inter-device calculator 118, a resize converter 119, and a P/S converter 120. The switch 116 is used to selectively output an image signal output from horizontal signal lines 115-a and 115-b for each channel to the frame memory 117. The frame memory 117 temporarily stores the output image signal as image data. The inter-device calculator 118 performs resizing and compression calculations according to the driving mode. The resize converter 119 resizes the image data stored in the frame memory 117 to a necessary angle of view based on the result calculated by the inter-device calculator 118. The image data resized by the resize converter 119 receives a parallel/serial (P/S) conversion by the P/S converter 120 and is sent to an image signal processing circuit 307 outside the image sensor 100. The timing controlling circuit 114 and the frame memory 117 are controlled by an overall control calculator 309 as a selector outside the image sensor 100.

The image sensor 100 and the image signal processing circuit 307 are connected by a plurality of lines, and signals of different pixels or signals of the same pixel according to the driving mode are distributed to a mainstream 121 and a sub stream 122, or transferred only from the mainstream. When no resizing or compression processing is necessary, data is directly transferred from the switch 116 to the P/S converter 120. A selectable driving mode includes read driving of all pixels, read driving that thins out ⅓ or ⅑ pixel values in the vertical direction, read driving that adds pixel values in the horizontal direction, read driving that thins out pixel values in the vertical direction and adds pixel values in the horizontal direction, and the like.

This embodiment uses the read driving that thins out ⅓ pixel values in the vertical direction by setting the display use image to the mainstream, and the read driving that thins out ⅑ pixel values in the vertical direction and adds pixel values in the horizontal direction by setting the detection use image to the sub stream. The mainstream 121 and the sub stream 122 have different read rows, and can perform independent operations in different imaging settings.

Figure 2:
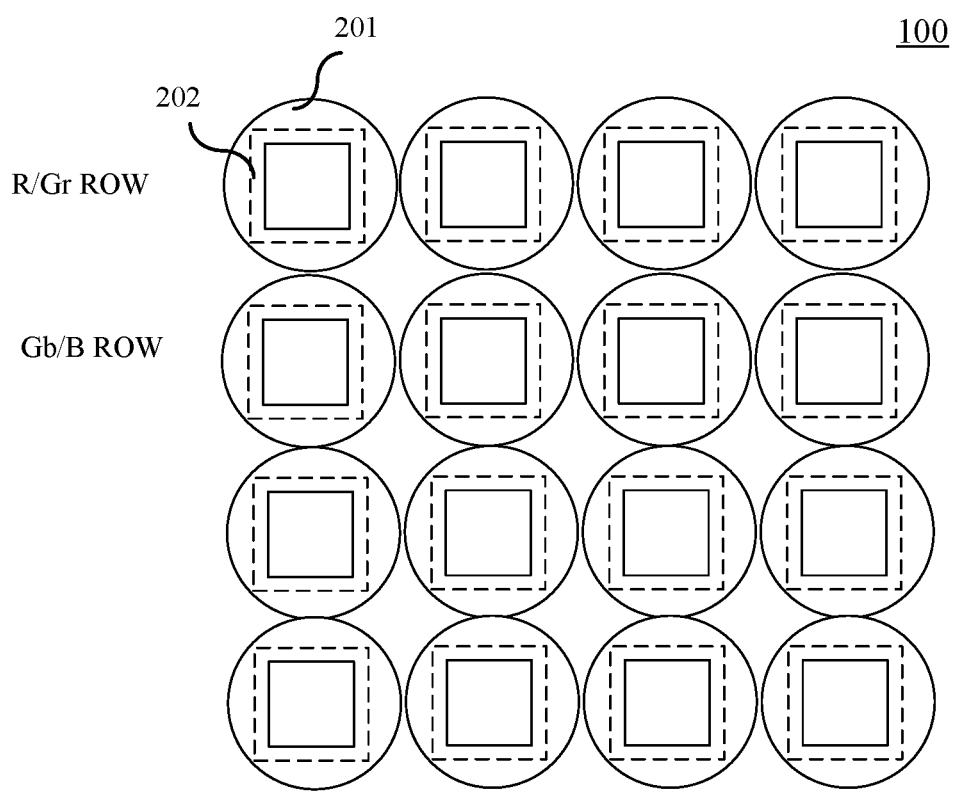
FIG. 2 is a pixel array diagram of an image sensor according to each embodiment.

Referring now to FIG. 2, a description will be given of the pixel array of the image sensor 100. FIG. 2 is the pixel array diagram of the image sensor 100. A Bayer array is applied to color filters, and red (R) and green (Gr) color filters are alternated in the pixels of the odd-numbered rows in order from the left. Green (Gb) and blue (B) color filters are alternated in the pixels of the even-numbered rows from left to right. An on-chip micro lens 201 is placed on a color filter 202.

Figure 3:
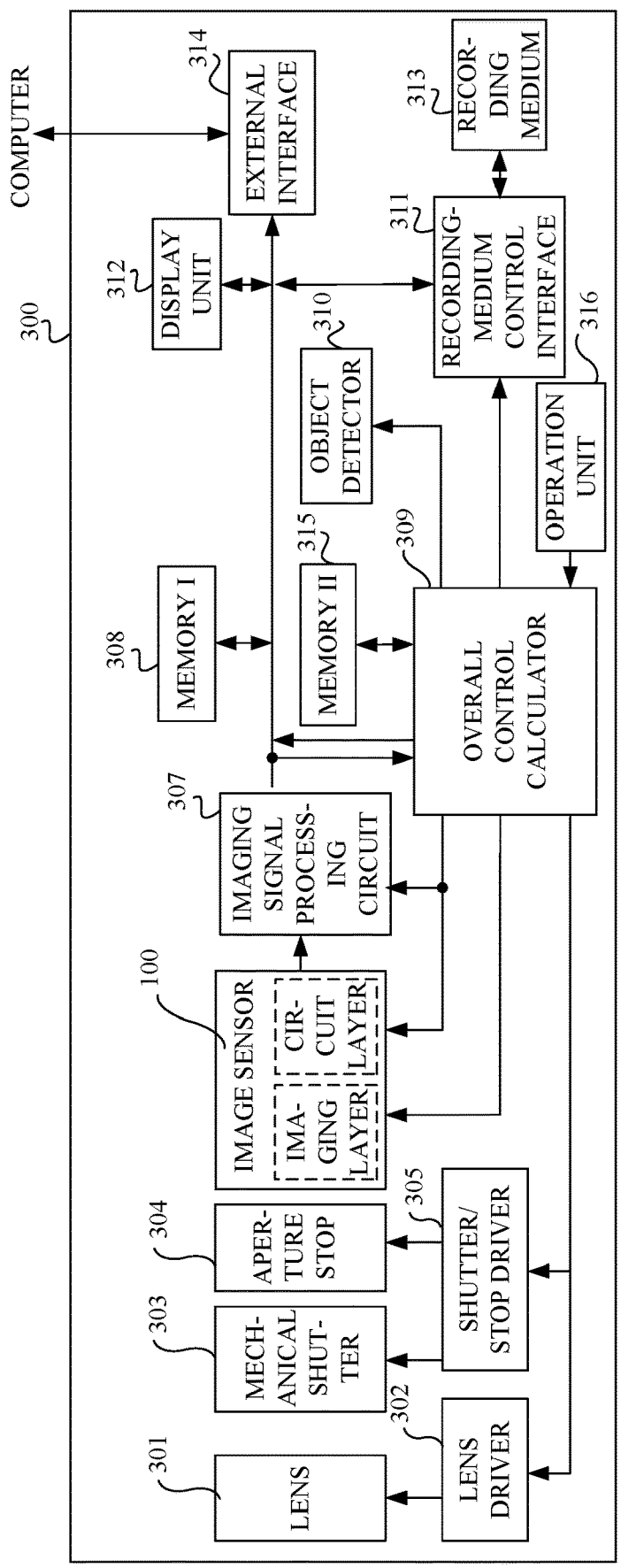
FIG. 3 is a configuration diagram of an imaging apparatus according to each embodiment.

Referring now to FIG. 3, a description will be given of a configuration of the imaging apparatus according to this embodiment. FIG. 3 is a configuration diagram of an imaging apparatus 300 according to this embodiment. The imaging apparatus 300 includes the image sensor 100.

A lens (imaging optical system) 301 is driven, and zooming, focusing, and the like are controlled by a lens driving mechanism 302. Driving of a mechanical shutter 303 and an aperture stop 304 is controlled by a shutter/stop driving mechanism 305. A light amount of an object image (optical image) that has passed through the lens 301 is properly adjusted by the mechanical shutter 303 and the aperture stop 304, and the object image is formed on an imaging plane on the image sensor 100. The image sensor 100 photoelectrically converts the object image formed on the imaging plane, performs a gain control and an A/D conversion from an analog signal to a digital signal, and outputs R, Gr, Gb, and B image signals to an imaging signal processing circuit 307. This embodiment integrates the lens 301 with the imaging apparatus (camera body) 300 including the image sensor 100. However, the present invention is not limited to this embodiment, and is also applicable to an imaging apparatus that includes a camera body and a lens (interchangeable lens) that is attachable to and detachable from the camera body.

The imaging signal processing circuit 307 performs predetermined calculation processing using the captured image signal. An overall control calculator 309 performs AE (auto-exposure control) and AF (autofocus control) based on the calculation result of the imaging signal processing circuit 307. The imaging signal processing circuit 307 performs predetermined calculation processing using the captured image signal, and performs a TTL type AWB (auto white balance) processing based on the obtained calculation result. The imaging signal processing circuit 307 performs various imaging signal processing such as low-pass filter processing for noise reductions, shading processing, and WB processing, various corrections, and compression of image signals. A memory I 308 temporarily stores the image signal processed by the imaging signal processing circuit 307. The overall control calculator 309 performs an overall control of the imaging apparatus 300 and various operations. The object detector 310 as a detection unit detects the object from the detection use image signal recorded in the memory I 308 via the overall control calculator 309. Information on the detected object is stored in a memory II 315.

A recording-medium control interface 311 records or reads an image signal on or from a recording medium 313. A display unit 312 sequentially reads output data for each line and displays the image signal and the detection area. The recording medium 313 is a removable storage medium such as a semiconductor memory, and records or reads the image signal. An external interface 314 is an interface for communicating with an external computer or the like. The memory II 315 stores the calculation result of the overall control calculator 309.

Information on the driving condition of the imaging apparatus 300 set by the user with an operation member 316 as an operation detection unit is sent to the overall control calculator 309. The overall control calculator 309 performs an overall control of the imaging apparatus 300 based on the information. The operation member 316 includes a shutter switch. The overall control calculator 309 is notified of the signal SW1 when the shutter switch is half-pressed, and the signal SW2 when the shutter switch is fully pressed.

Figure 4:
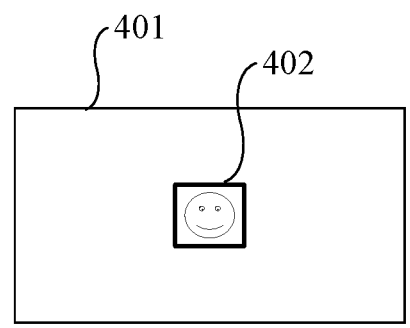
FIG. 4 is an explanatory diagram of a display image of the imaging apparatus according to each embodiment.

Referring now to FIG. 4, a description will be given of a screen (display image) displayed on the display unit 312 of the imaging apparatus 300. FIG. 4 is an explanatory diagram of the display image of the imaging apparatus 300. In FIG. 4, reference numeral 401 denotes a display video signal, and reference numeral 402 denotes an example that displays by a frame an object detected by the object detector 310.

There are a number of known technologies for detecting an object. For example, many technologies have been proposed, such as the technology for detecting an object from an individual image using the image recognition technology such as the face detection, and the technology for detecting (tracking) a movement of an area designated as an object area such as moving body detection. Generally, the accuracy of the face detection can be improved by combining a plurality of these methods. This embodiment detects the face area. Information on the detected face area is stored in the memory II 315. The overall control calculator 309 converts the detection area into display information that allows the user to visually recognize the detection area based on the information of the face area stored in the memory II 315. This embodiment displays a frame that encloses the detected area by superimposing it on the display use image signal. Other examples include displaying coordinate information.

Figure 5:
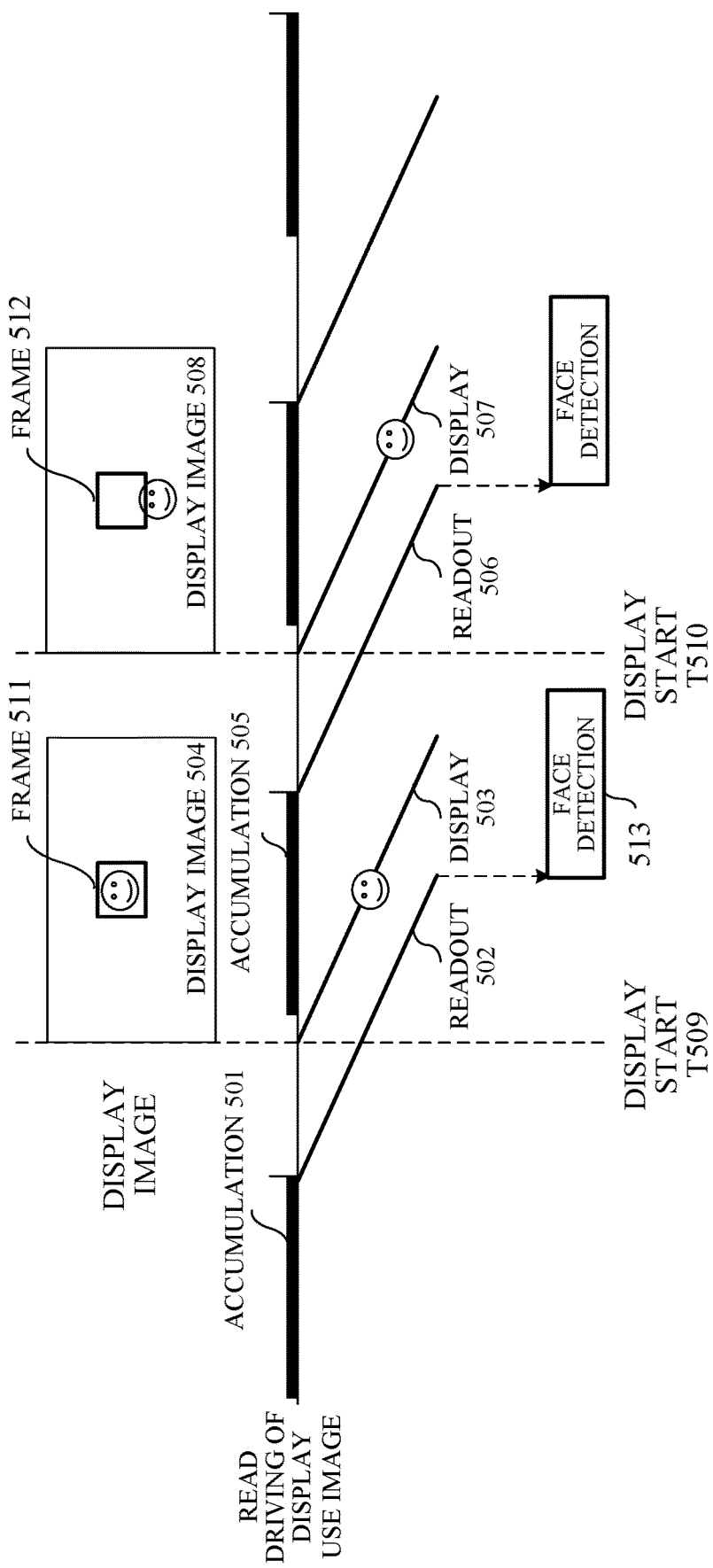
FIG. 5 is a conceptual diagram of image-display control processing according to a comparative example.

Referring now to FIG. 5, a description will be given of image-display control processing according to a comparative example. FIG. 5 is a conceptual diagram of image-display control processing according to the comparative example. An image signal accumulated in accumulation 501 undergoes read processing as indicated by readout 502. The read image is input into the object detector 310 and undergoes face detection 513.

After display start T509, display processing is performed as indicated by display 503. At this time, display image 504 is output to the display unit 312, and frame 511 is displayed on the object of the display image 504 without any delays or shifts. However, assume that the object position changes in the next frame, and display image 508 is output to the display unit 312. The display image 508 is output after a series of processes of accumulation 505, readout 506, and display 507 after the display start T510 are performed as described above, but the position of the frame 512 is calculated based on the information of the object detected by the face detection 513. Therefore, the frame 512 is delayed or shifted by one frame relative to the object of the display image 508.

Figure 6A:
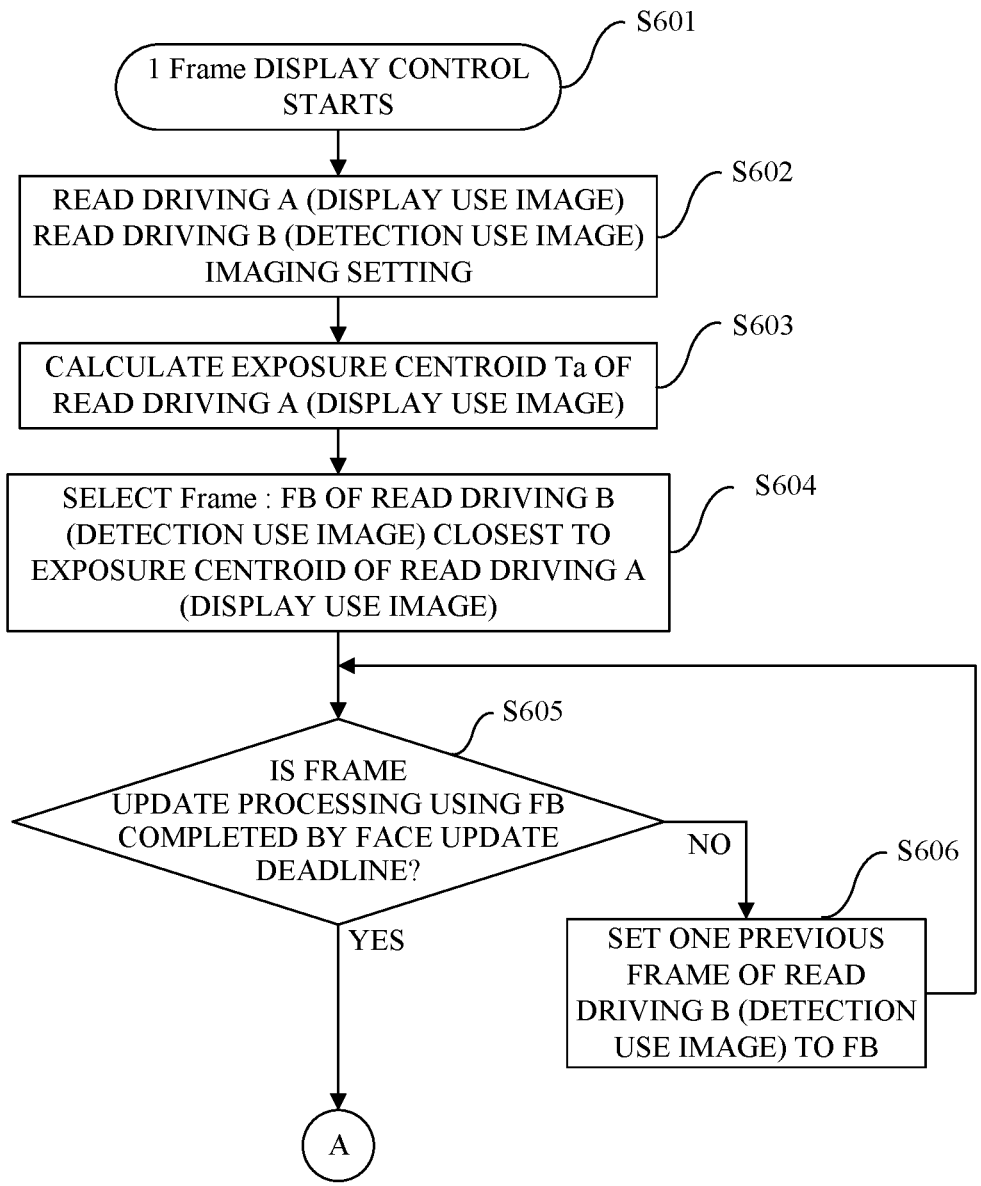
FIGS. 6A and 6B are a flowchart showing image-display control processing according to a first embodiment.
Figure 6B:
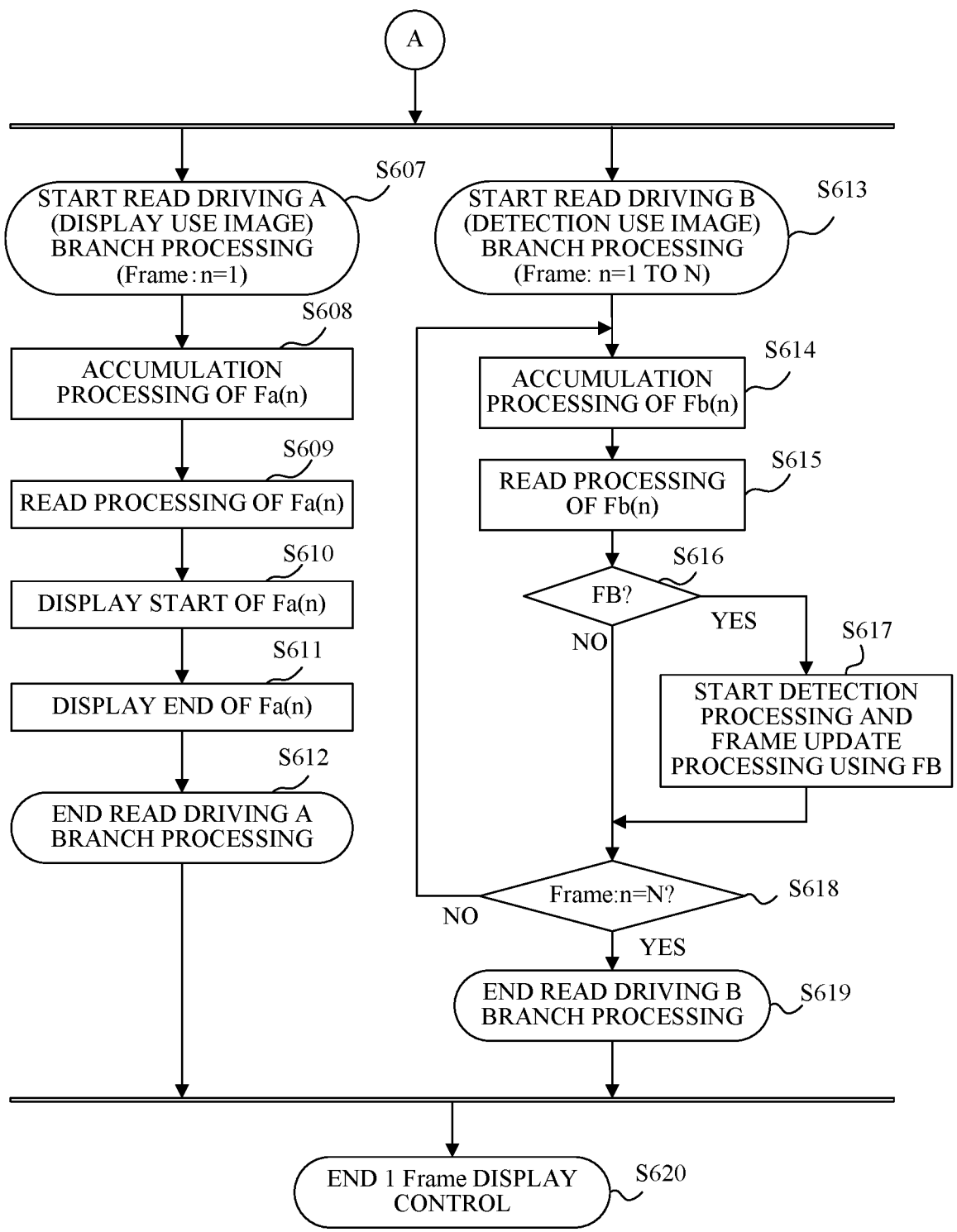
Figure 7:
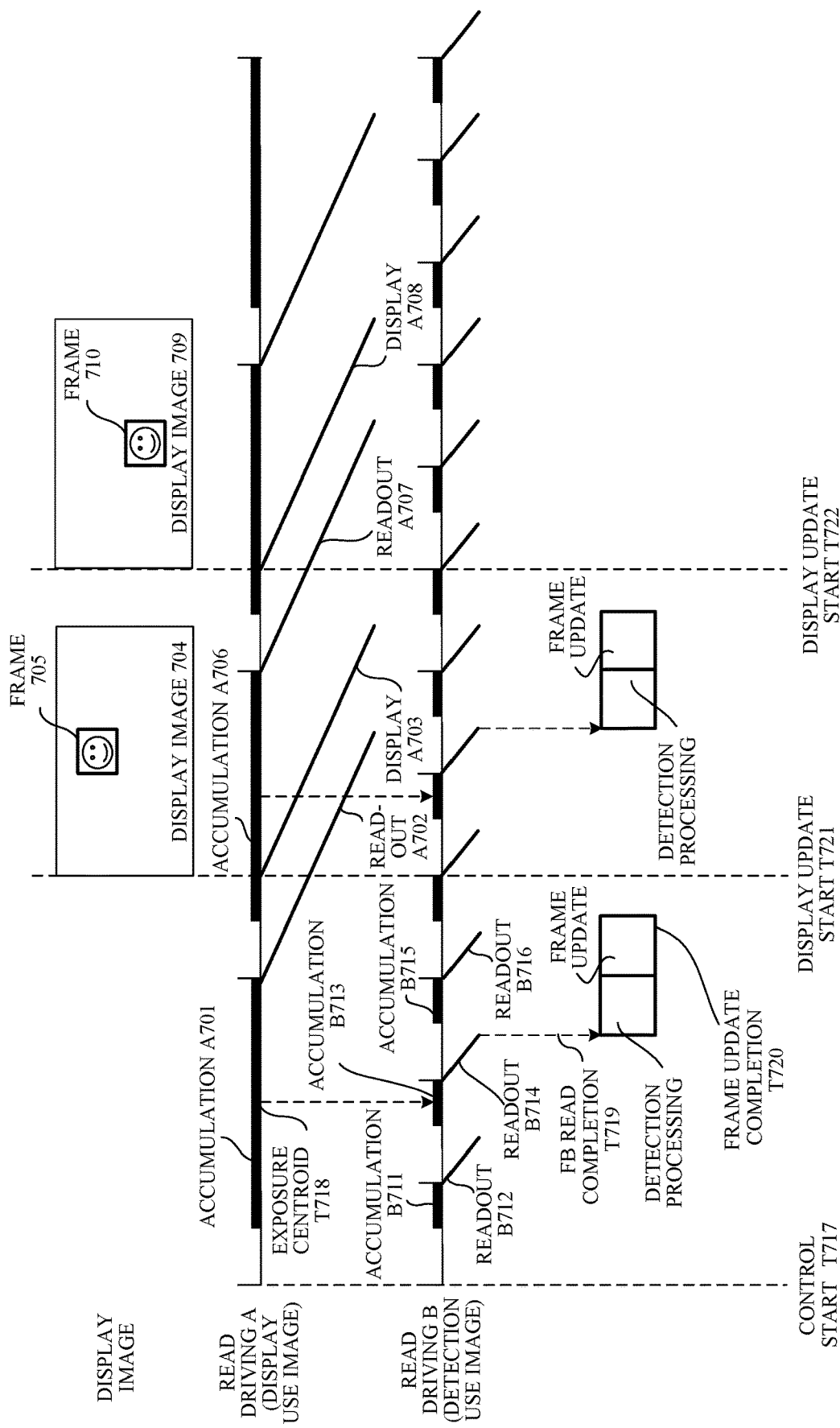
FIG. 7 is a conceptual diagram of image-display control processing according to the first embodiment.

Referring now to FIGS. 6 and 7, a description will be given of image-display control processing performed by the imaging apparatus 300 according to this embodiment. FIGS. 6A and 6B are a flowchart illustrating the image-display control processing according to this embodiment. Each step in FIGS. 6A and 6B is mainly executed by the overall control calculator 309, for example, in accordance with an image display control program that serves as a computer program. FIG. 7 is a conceptual diagram of the image display according to this embodiment, and illustrates a relationship among the read driving of the display image and the display use image, and the read driving of the detection use image.

First, in the step S601 in FIG. 6A, the overall control calculator 309 starts the display control until an image for one frame is displayed. In FIG. 7, displaying for one frame means displaying from a display update start timing T721 to a display image 704 and a frame 705 using accumulation A701, the readout A702, and display A703. The overall control calculator 309 performs detection processing and a frame update processing using the image signal obtained from the readout by the read driving B in the frame 705.

This display control is performed up to the step S620, and the steps S601 to S620 are similarly repeated for the screen display of the second and subsequent frames. In FIG. 7, displaying the second frame means that displaying the display image 709 and the frame 710 from the display update start timing T722 using accumulation A706, readout A707, and display A708. The overall control calculator 309 performs detection processing and frame update processing in the frame 710 using the image signal obtained from the readout of the read driving B.

Next, in the step S602 in FIG. 6, the overall control calculator 309 sets reading the display use image to read driving A and reading the detection use image to read driving B, and sets multi-stream driving. More specifically, the overall control calculator 309 performs the accumulation setting and the read setting of the read driving A and read driving B. In this embodiment, the overall control calculator 309 sets the frame rate for reading the detection use image to be faster than the frame rate for reading the display use image.

Next, in the step S603, the overall control calculator 309 calculates the exposure centroid (exposure centroid timing Ta) of the display use image. The exposure centroid timing Ta is indicated by T718 in FIG. 7. Next, in the step S604, the overall control calculator 309 selects a frame for detection use driving in which imaging was performed at a timing closest to the exposure gravity center timing Ta calculated in the step S603. Assume that the selected frame is FB. In this embodiment, the overall control calculator 309 selects the frame FB for detection use driving that has accumulated at the timing closest to the exposure centroid. The selected frame FB is an image signal obtained from accumulation B713 and readout B714 in FIG. 7.

Next, in the step S605, the overall control calculator 309 determines whether the frame update processing using the frame FB selected in the step S604 is completed by a frame update deadline. If the update processing is completed by the frame update deadline, the flow proceeds to branch processing steps S607 and S613. On the other hand, if the update processing is not completed by the frame update deadline, the flow proceeds to the step S606. In this embodiment, as illustrated in FIG. 7, the overall control calculator 309 detects a face area in an image using an image signal obtained by readout B712 of the selected frame FB, and updates the frame based on the detection result. The timing at which the detection processing time and the frame update processing time have elapsed from read completion timing T719 of the selected frame FB is frame update completion timing T720. The frame update deadline is the same timing as the display update start timing T721. The overall control calculator 309 determines whether or not the frame update completion timing T720 is completed by the display update start timing T721. Since the processing is completed in the example of FIG. 7, the flow proceeds to the branch processing steps S607 and S713. In the step S606, the overall control calculator 309 reselects a frame captured one frame before the frame FB selected in the step S604. The details will be described later with reference to FIG. 8.

Next, the read driving A and the read driving B branch into the steps S607 and S613 as parallel processing. Assume that the frame for the read driving A is represented by Fa(n), and n=1 for the display control of the image for one frame from the step S601 to the step S620. Assume that the frame for the read drive B has n=1 to N (N is a natural number of 2 or more depending on the frame rate) for the display control of the image for one frame from the step S601 to the step S620. This embodiment sets the read driving A to 30 fps, the read driving B to 90 fps, and n to 1 to 3.

In the step S607, the overall control calculator 309 starts processing relating to the frame Fa(n) for the display use image. In FIG. 7, it is indicated by control start timing T717. Next, in the step S608, the overall control calculator 309 performs accumulation processing of the frame Fa(n). This processing is represented by the accumulation A701 in FIG. 7. If n=2, this processing is represented by the accumulation A706 in FIG. 7. Next, in the step S609, the overall control calculator 309 performs read processing of the frame Fa(n). This processing is represented by the readout A702 in FIG. 7. Next, in the step S610, the overall control calculator 309 starts the display processing of the frame Fa(n). This processing is represented by display A703 in FIG. 7. Next, in the step S611, the overall control calculator 309 ends the display processing of the frame Fa(n). This processing is represented by the display A703 and display update start timing T722 in FIG. 7. Next, in the step S612, the overall control calculator 309 ends the processing on the frame Fa(n).

In the step S613, the overall control calculator 309 starts processing relating to the frame Fb(n) for the detection use image. In FIG. 7, this processing is represented by control start timing T717. Next, in the step S614, the overall control calculator 309 performs the accumulation processing of the frame Fb(n). This processing is represented by accumulation B711 in FIG. 7. When n=2, 3, this processing is represented by accumulations B713 and B715 in FIG. 7, respectively. Next, in the step S615, the overall control calculator 309 performs read processing of the frame Fb(n). This processing is represented by readout B712 in FIG. 7. When n=2, 3, this processing is represented by readouts B714 and B716 in FIG. 7, respectively.

Next, in the step S616, the overall control calculator 309 determines whether the frame Fb(n) is the frame FB selected in the step 604. In FIG. 7, when n=1, the image signal obtained by readout B712 is not the frame FB. When n=2, the image signal obtained by the readout B712 is the frame FB. If the image signal is the frame FB, the flow proceeds to the step S617. On the other hand, if the image signal is not the frame FB, the flow proceeds to the step S618.

In the step S617, the overall control calculator 309 starts the detection processing and frame update processing using the frame FB. The updated frame information is displayed at display update start timing T717 in FIG. 7. In the step S618, the overall control calculator 309 determines whether the frame Fb(n) is frame Fb(N). When the frame Fb(n) is the frame Fb(N), the flow proceeds to the step S619. On the other hand, if the frame Fb(n) is not the frame Fb(N), the flow proceeds to the step S614. In the step S614, the overall control calculator 309 processes the (n+1)-th frame Fb(n+1). In the step S619, the overall control calculator 309 ends the processing for the frame Fb(n).

In the step S620, the overall control calculator 309 ends the display control until an image for one frame is displayed.

Figure 8:
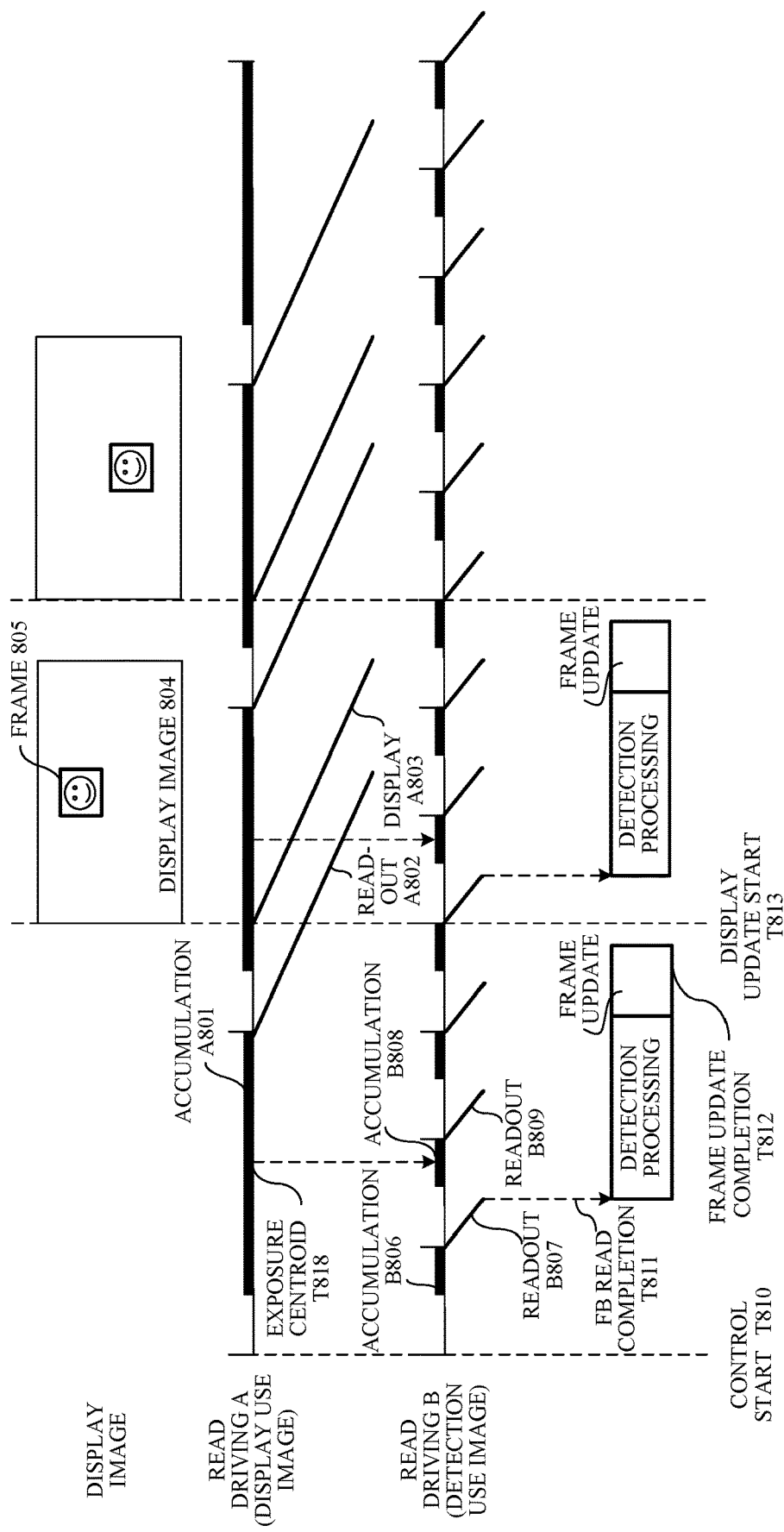
FIG. 8 is a conceptual diagram of the image display when a detection use image signal used in the first embodiment is reselected.

Referring now to FIG. 8, a description will be given of an image display when the detection use image signal to be used is reselected. FIG. 8 is a conceptual diagram of the image display when the detection use image signal to be used is reselected, and illustrates a relationship between the read driving of the display image and the display use image, and the read driving of the detection use image. The flowchart by the overall control calculator 309 is the same as that in FIG. 6.

First, in the steps S601 and S602, the overall control calculator 309 performs the same control as that described above. Next, in the step S603, the overall control calculator 309 calculates the exposure centroid timing Ta of the display use image. The exposure centroid timing Ta is indicated by T818 in FIG. 8. Next, in the step S604, the overall control calculator 309 selects the frame FB for detection use driving for which the imaging was performed at a timing closest to the exposure centroid timing Ta calculated in the step S603. Assume that the selected frame is FB. In this embodiment, the overall control calculator 309 selects the frame for detection use driving that was accumulated at the timing closest to the exposure centroid. The selected frame FB is an image signal obtained from accumulation B808 and readout 809 in FIG. 8.

Next, in the step S605, the overall control calculator 309 determines whether or not the frame update processing using the frame FB selected in the step S604 is completed by the frame update deadline. The frame update deadline is the same timing as display update start timing T813. In the example of FIG. 8, it is determined that the update processing is not completed by the frame update deadline, and the flow proceeds to the step S606.

In the step S606, the overall control calculator 309 reselects a frame captured one frame before the frame FB selected in the step S604. In FIG. 8, the image signal obtained by reading B807 is reselected. When the overall control calculator 309 reselects the image signal, the flow returns to the step S605. The example in FIG. 8 illustrates an example that reselects the frame in the step S606, so that the frame update completion timing T812 is timely performed by the display update start timing T813 in the step S605. Thus, the flow proceeds to the branch processing steps S607 and S613.

The steps S607 to S620 are the same control as those described above. The example of FIG. 8 uses the readout B807 for the image signal for the detection processing and the frame update row processing in the step S617, and the frame 805 displayed in the display image 804 has undergone the readout B807.

As described above, in this embodiment, the control apparatus includes the object detector 310 and the overall control calculator 309. The object detector 310 determines a specific area based on a signal (image signal) captured by the image sensor 100 that can provide the first imaging operation (S608, S609) and the second imaging operation (S614, S615). The overall control calculator 309 selects the imaging timing (B713) of the second imaging operation based on the first imaging operation of the image sensor 100. The object detector 310 detects the specific area using the signal captured at the imaging timing selected by the overall control calculator 309.

The overall control calculator 309 may select the imaging timing of the second imaging operation (T713) based on the accumulation timing (A701) of the first imaging operation and the timing (T719) using the detection result by the object detector 310. The overall control calculator 309 may select the imaging timing of the second imaging operation based on the exposure centroid (T718) of the first imaging operation. The frame rate for the second imaging operation may be higher than the frame rate for the first imaging operation. The control apparatus may include the display unit 312 that displays the specific area detected by the object detector 310. The overall control calculator 309 may select the imaging timing (B713) of the second imaging operation based on the timing (T721) at which the display unit 312 uses the detection result by the object detector 310. The specific area may be an object area.

This embodiment switches the image signal used for the detection according to the imaging setting of the display use image signal and the use timing of the detection use image signal, and thereby can display the tracking area with a small delay or shift amount relative to the display of the live-view image.

Second Embodiment

Figure 9A:
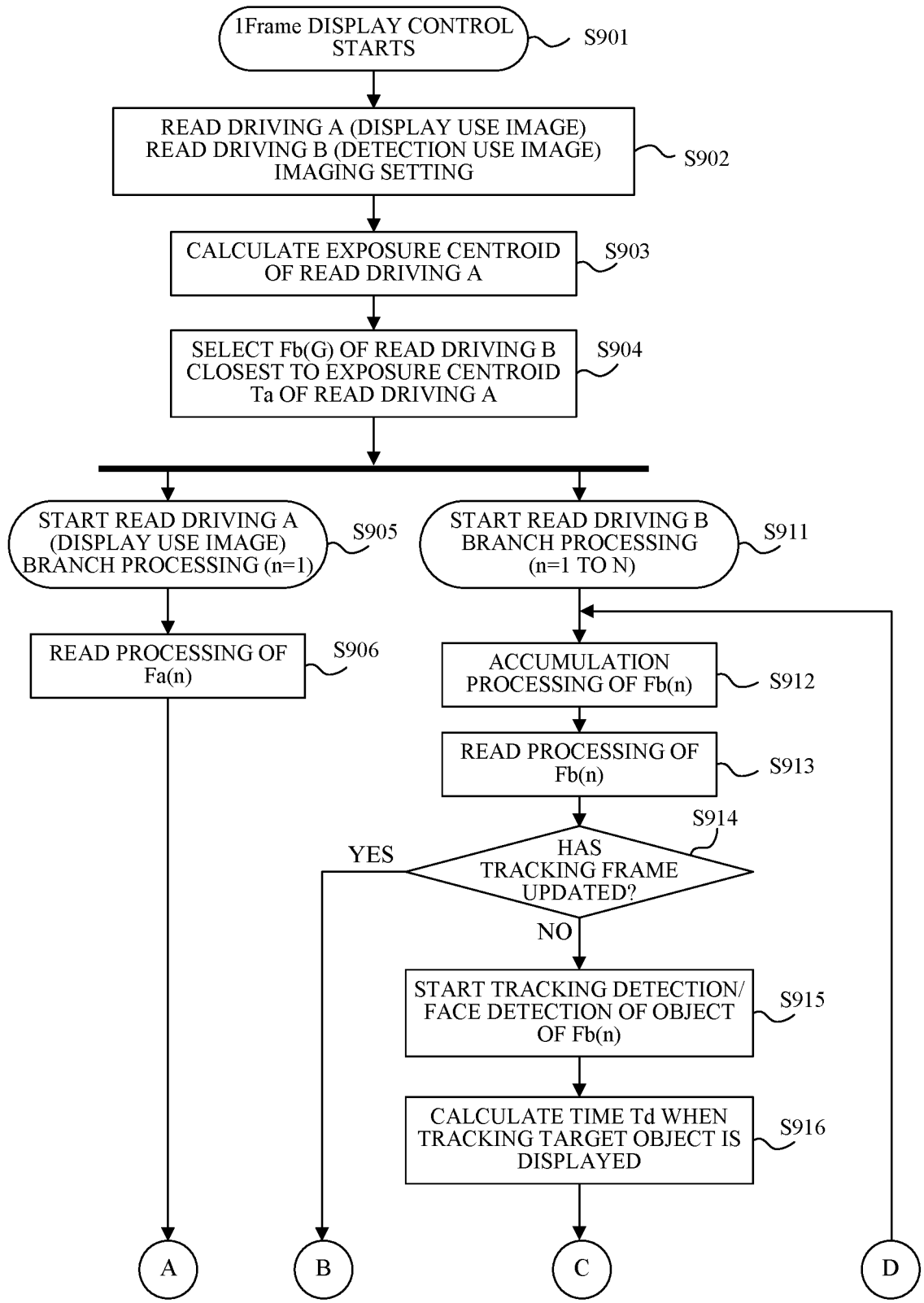
FIGS. 9A and 9B are a flowchart showing image-display control processing according to a second embodiment.
Figure 9B:
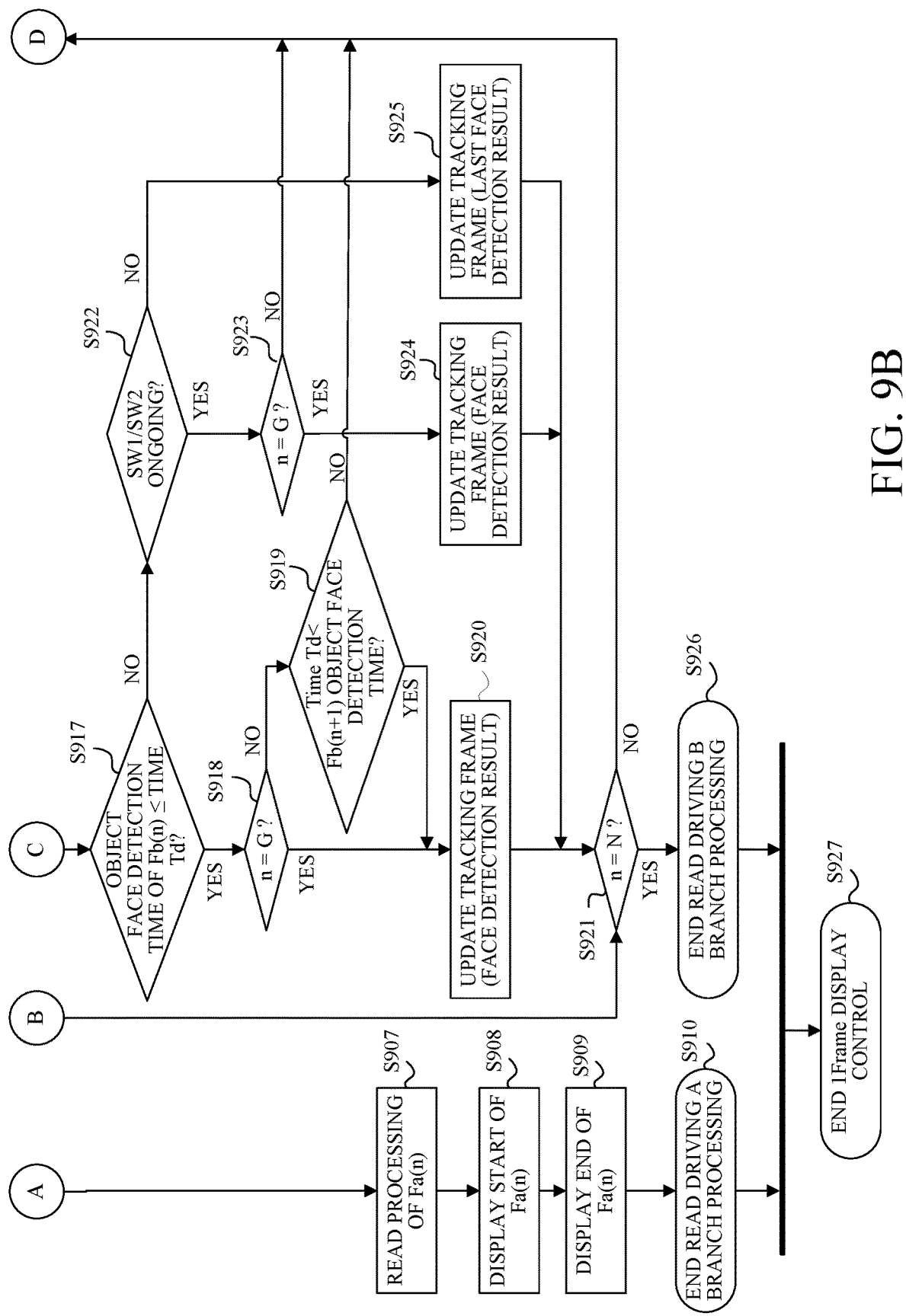
Figure 10:
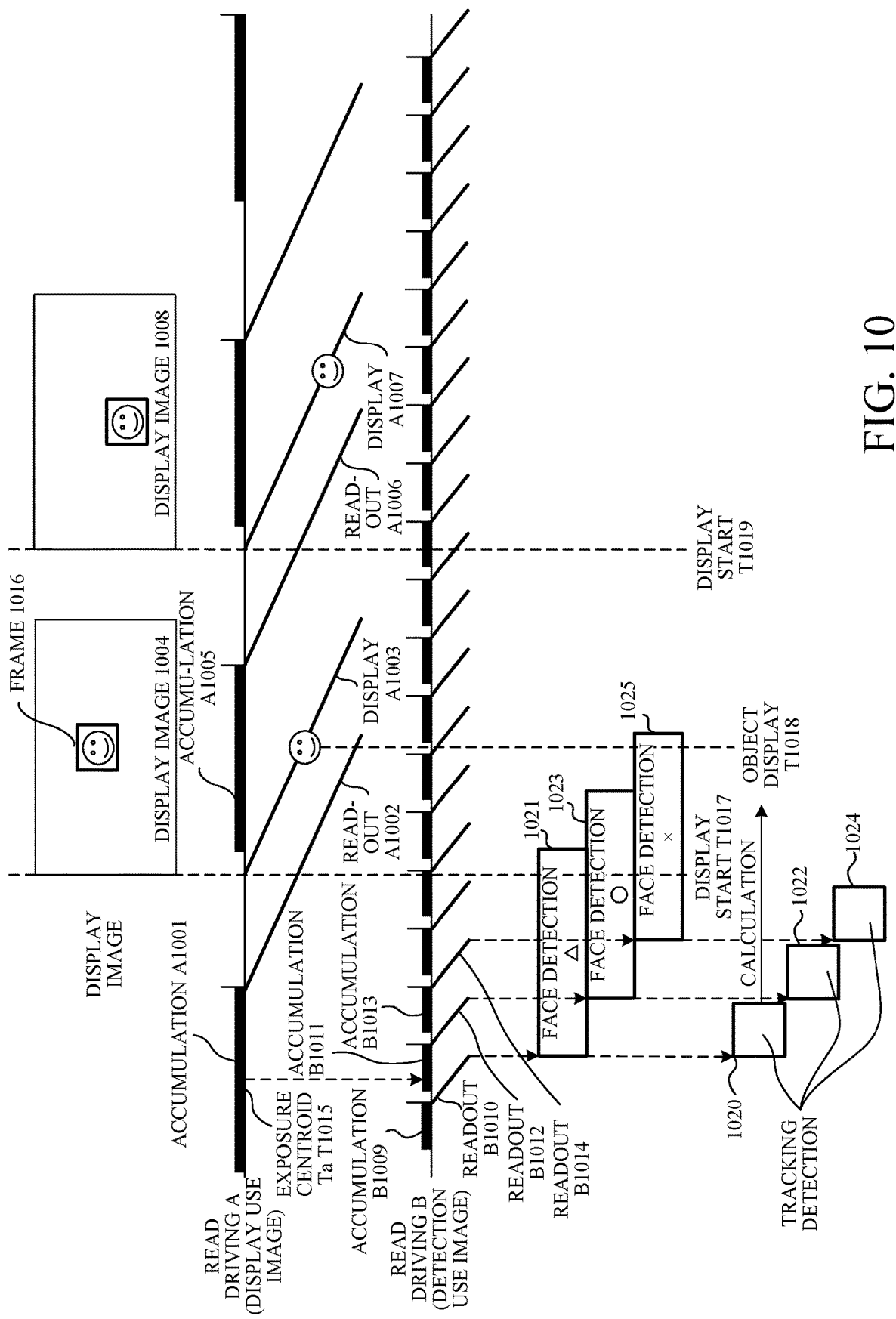
FIG. 10 is a conceptual diagram of image-display control processing according to the second embodiment.
Figure 11:
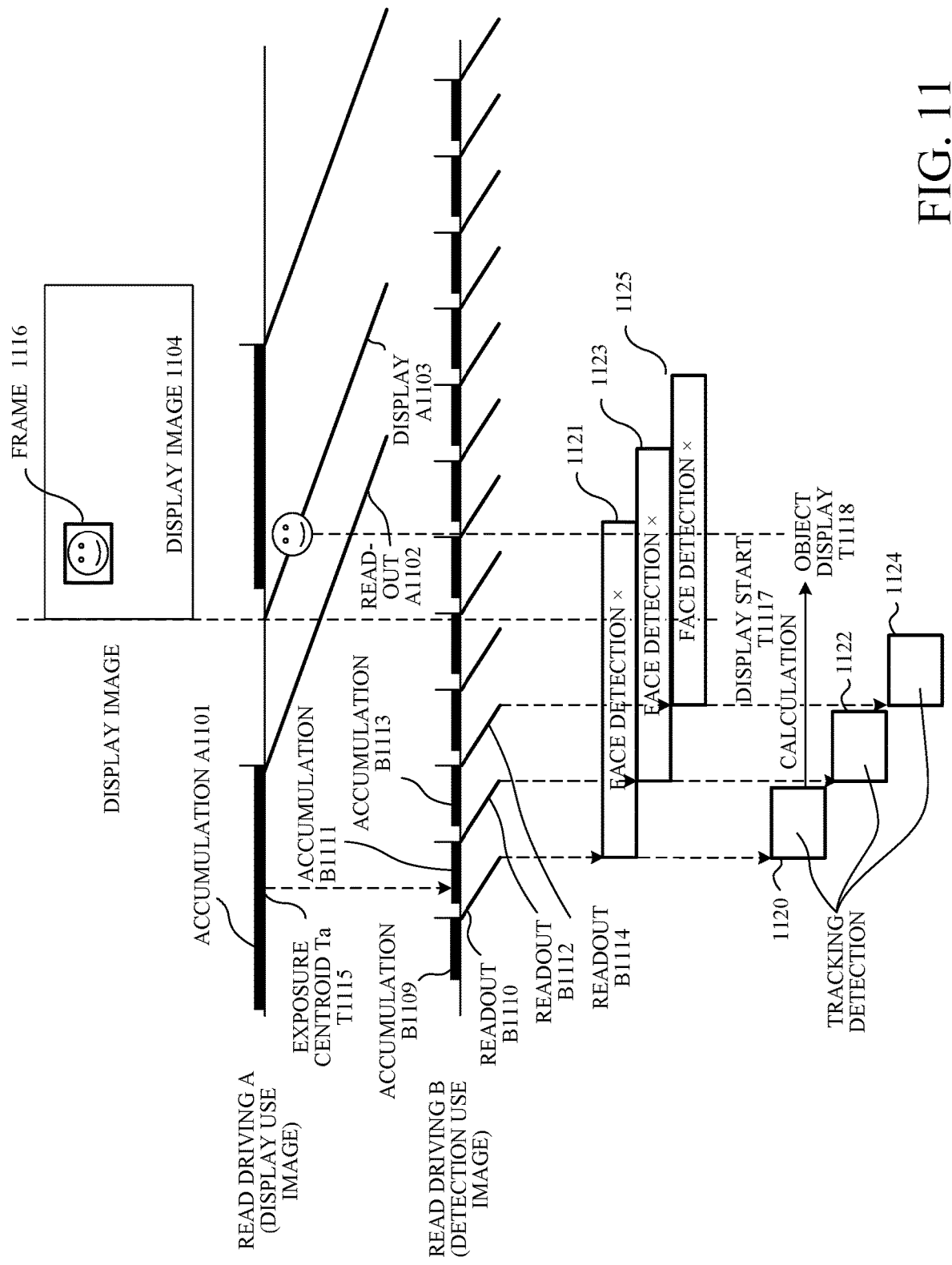
FIG. 11 is a conceptual diagram of image-display control processing according to the second embodiment.

Referring now to FIGS. 9A to 11, a description will be given of image-display control processing according to a second embodiment of the present invention. FIGS. 9A and 9B are a flowchart illustrating the image-display control processing according to this embodiment. Each step in FIGS. 9A and 9B is mainly executed by the overall control calculator 309, for example, in accordance with an image display control program that is a computer program. FIGS. 10 and 11 are conceptual diagrams of image display according to this embodiment, and illustrate a relationship between the read driving for the display image and the display use image, and the read driving for the detection use image. This embodiment has a basic configuration of the imaging apparatus similar to that of the imaging apparatus 300 according to the first embodiment, and a description thereof will be omitted.

This embodiment presumes that the face detection needs to recognize a plurality of parts constituting the face, and the detection accuracy is high but the calculation is complicated and the processing takes a long time, so that the detection speed is inferior to the moving object detection. On the other hand, since the moving body detection detects the object by calculating the difference between a plurality of frame images, the detection speed is high, but the detection is inferior to the face detection in detection accuracy, for example, the detection becomes difficult when the object luminance changes. However, the accuracy and speed of the object detector 310 depend on the detection target, environment, contents, and the like, and are not limited to the above premise.

This embodiment uses the face detection and moving body detection for the object detector 310 of the object. The intention is based on the premise that the face detection has higher detection accuracy and lower detection speed than moving body detection. However, if the detection speed of the face detection is as high as that of the moving body detection, only the face detection may be used, and if the detection accuracy of the moving body detection is as high as that of the face detection, only the moving body detection may be used. For convenience, this embodiment refers to the face detection by the object detection unit 310 as the "face detection," and the moving body detection as the "tracking detection." Object information detected by each of them includes at least the position and range (size) of the object.

First, in the step S901 in FIG. 9A, the overall control calculator 309 starts the display control until an image for one frame is displayed. This display control is performed up to the step S927, and processing of the steps S901 to S927 is similarly repeated for the image display of the second and subsequent frames.

Next, in the step S902, the overall control calculator 309 performs the two-system imaging setting, or the read driving A for the display use image and the read driving B for the detection use image. In this embodiment, the frame rate for the read driving B is higher than the frame rate for the read driving A. Next, in the step S903, the overall control calculator 309 calculates the exposure centroid Ta of the read driving A. The exposure centroid Ta is represented by T1015 in FIG. 10 and T1115 in FIG. 11. Next, in the step S904, the overall control calculator 309 calculates the frame Fb(G) of the read driving B closest to the exposure centroid Ta of the read driving A. The frame Fb(G) is represented by accumulation B1011 (readout B1012) in FIG. 10 and accumulation B1111 (readout B1112) in FIG. 11.

Subsequently, the read driving A and the read driving B are branched into the steps S905 and S911 as parallel processing. Assume that the frame for the read driving A is represented by Fa(n), and n=1 for the display control of the image for one frame in the steps S901 to S927. The frame for the read driving B is represented by Fb(n), and n=1 to N (N is a natural number of 2 or more depending on the frame rate) for the display control of the image for one frame in the steps S901 to S927. Despite the duplicate description, the frame for the read driving B closest to the above exposure centroid Ta of the read driving A is represented by Fb(G).

In the step S905, the overall control calculator 309 starts processing relating to the frame Fa(n). Next, in the step S906, the overall control calculator 309 performs accumulation processing for the frame Fa(n). This processing is represented by accumulations A1001 and A1005 in FIG. 10 and accumulation A1101 in FIG. 11. Next, in the step S907, the overall control calculator 309 performs read processing for the frame Fa(n). This processing is represented by readouts A1002 and A1006 in FIG. 10 and readout A1102 in FIG. 11. Next, in the step S908, the overall control calculator 309 starts display processing for the frame Fa(n). This processing is represented by displays A1003 (T1017) and A1007 (T1019) in FIG. 10 and display A1103 (T1117) in FIG. 11. Next, in the step S909, the overall control calculator 309 ends the display processing for the frame Fa(n). This processing is represented by displays A1003 and A1007 in FIG. 10 and display A1103 in FIG. 11. Next, in the step S910, the overall control calculator 309 ends the processing relating to the frame Fa(n).

In the step S911, the overall control calculator 309 starts processing relating to the frame Fb(n). Next, in the step S912, the overall control calculator 309 performs accumulation processing for the frame Fb(n). This processing is represented by accumulations B1009, B1011, and B1013 in FIG. 10 and accumulations B1109, B1111, and B1113 in FIG. 11. Next, in the step S913, the overall control calculator 309 performs read processing for the frame Fb(n). This process is represented by accumulations B1010, B1012, and B1014 in FIG. 10, and accumulations B1110, B1112, and B1114 in FIG. 11. Next, in the step S914, the overall control calculator 309 determines whether the tracking frame for the object has been updated. The tracking frame is updated in the steps S920, S924, and S925 described below. If the tracking frame has been updated, the flow proceeds to the step S921. On the other hand, if the tracking frame has not been updated, the flow proceeds to the step S915.

In the step S915, the overall control calculator 309 starts the tracking detection and face detection of the frame Fb(n). This processing is represented by tracking detections 1020, 1022, and 1024 and the face detections 1021, 1023, and 1025 in FIG. 10, and the tracking detections 1120, 1122, and 1124, and the face detections 1121, 1123, and 1125 in FIG. 11. In this embodiment, the overall control calculator 309 simultaneously operates a plurality of face detections. However, when a plurality of face detections cannot be operated at the same time, the already operating face detection may be stopped a new face detection may be started.

Next, in the step S916, the overall control calculator 309 calculates time Td at which the tracking target object is displayed, using information of the object obtained by the tracking detection performed in the step S915. The time Td is represented by T1018 in FIG. 10 and T1118 in FIG. 11. Since the object information includes information corresponding to the object position in the coordinate system of the display image, the time from when the display starts to the time Td when the object is displayed can be calculated. In other words, the value of the time Td depends on the object position in the display image, and is larger as the object is located at a lower position, and is larger as the object is closer to the right side on the same line.

Next, in the step S917, the overall control calculator 309 determines whether the face detection time of the object does not exceed the time Td calculated in the step S916. The face detection time uses the actual value of the processing for the previous frame. The time Td is derived from the temporal relationship between the face detections 1021, 1023, 1025 and T1018 in FIG. 10, and the face detections 1121, 1123, and 1125 in FIG. 11. As a result, it is determined in FIG. 10 that the face detections 1021 and 1023 do not exceed the time Td, and the face detection 1025 is determined to exceed the time Td. In FIG. 11, it is determined that the face detections 1121, 1123, and 1125 exceed the time Td. If it does not exceed the time Td, the flow proceeds to the step S918. On the other hand, if it exceeds the time Td, the flow proceeds to the step S922. FIG. 11 illustrates a conceptual diagram where the face detection time takes a long time, and none of the face detections is synchronized with updating the frame 1116. In such a case, processing subsequent to the step S922 is performed.

In the step S918, the overall control calculator 309 determines whether or not the frame Fb(n) is Fb(G). If the frame Fb(n) is Fb(G), the flow proceeds to the step S920. On the other hand, if the frame Fb(n) is not Fb(G), the flow proceeds to step S919. In the step S919, the overall control calculator 309 determines whether the face detection time of the object in the frame Fb(n+1) exceeds the time Td calculated in the step S915. If the face detection time exceeds the time Td, the flow proceeds to the step S920. On the other hand, if the face detection time does not exceed the time Td, the flow proceeds to the step S912 and the overall control calculator 309 processes the frame Fb(n+1).

In the step S920, the overall control calculator 309 updates the tracking frame for the tracking target object using the object information obtained by the face detection performed in the step S915. The result of this processing is represented by box 1016 in FIG. 10. Next, in the step S921, the overall control calculator 309 determines whether or not the frame Fb(n) is Fb(N). When the frame Fb(n) is Fb(N), the flow proceeds to the step S926. On the other hand, when the frame Fb (n) is not Fb(N), the flow proceeds to the step S912, and the overall control calculator 309 processes the frame Fb(n+1).

In the step S922, the overall control calculator 309 determines whether or not SW1 or SW2 is being ongoing. If SW1 or SW2 is ongoing, the flow proceeds to the step S923. On the other hand, if none of SW1 and SW2 is ongoing, the flow proceeds to the step S925. In the flow passing the step S922, as described in the step S917, the frame 1116 cannot be timely updated depending on the face detection time. In this case, in this embodiment, the overall control calculator 309 updates the tracking frame using the object information obtained by the tracking detection for the purpose of emphasizing the tracking speed if SW1 or SW2 is ongoing. On the other hand, if none of SW1 and SW2 is ongoing, the overall control calculator 309 updates the tracking frame using the object information obtained by the face detection in the previous frame. This will be described in the following steps S923 to S925.

In the step S923, the overall control calculator 309 determines whether the frame Fb(n) is Fb(G). When the frame Fb(n) is Fb(G), the flow proceeds to the step S924. On the other hand, when the frame Fb(n) is not Fb(G), the flow proceeds to the step S912, and the overall control calculator 309 processes the frame Fb(n+1).

In the step S924, the overall control calculator 309 updates the tracking frame for the tracking target object using the object information obtained by the tracking detection performed in the step S915. The result of this processing is represented by box 1116 in FIG. 11. In the step S925, the overall control calculator 309 updates the tracking frame for the tracking target object using the information of the object by the face detection performed in the step S915 in the previous frame. The result of this processing is represented by box 1116 in FIG. 11.

In the step S926, the overall control calculator 309 ends the processing for the frame Fb(n). Next, in the step S927, the overall control calculator 309 ends the display control until an image for one frame is displayed.

As described above, in this embodiment, the control apparatus includes the object detector 310 and the display unit 312. The object detector 310 detects an object in an image based on a signal captured by the image sensor 100 that can provide the first imaging operation (S906 and S907) and the second imaging operation (S912 and S913). The display unit 312 displays an image obtained by the first imaging operation (S908 and S909). The display unit 312 displays the object area detected by the object detector 310. The object detector 310 detects the object using the image captured by the second imaging operation (S920). The display unit 312 displays the object area detected using the specific image selected from the image to complete (S917) the detection by the object detector 310 by the time when the object to be tracked is displayed (Td: S915). The specific image is an image obtained by accumulation (S904, S918) closest to the exposure time (Ta) in the first imaging operation (S920, S921).

The exposure time may be the exposure centroid. The frame rate for the second imaging operation may be higher than the frame rate for the first imaging operation. The object detector 310 may be able to perform the first detection processing and the second detection processing that is faster than the first detection processing, and the time when the tracking target object is displayed is determined based on the object information detected by the second detection processing (S915). The first detection processing may be face detection processing, and the second detection processing may be tracking detection processing. The control apparatus may include the operation member 316 that detects a specific operation. If there is no image for which the first detection processing is completed by the time when the tracking target object is displayed (No in S917), the display unit 312 may display the detected object area using the specific image according to the detection contents by the operation member 316 (S923). The specific image may be an image selected from the image for which the second detection processing is completed by the above time. The specific image is an image obtained by the accumulation (S904, S924) closest to the exposure time in the first imaging operation (S914, S925). The specific operation may be at least one of half-pressing, full-pressing of the shutter button, or designating the tracking target.

By updating the tracking frame using the optimal image for detecting the object by the time when the tracking target object is displayed, this embodiment can display the tracking frame for the object without any delays or shifts.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a control apparatus, an imaging apparatus, a control method, and a program, each of which can display a tracking area with a small delay or shift amount relative to the display of a live-view image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-097285, filed on May 24, 2019, which is hereby incorporated by reference herein in its entirety.

What is claimed is:

1. An imaging apparatus comprising:
an image sensor;
a display; and
at least one processor configured to perform operations as:
   a control unit configured to display on the display an image in which information indicating an area of an object is superimposed on an image based on image data read out by a first readout operation of the image sensor; and
   a detection unit configured to detect the object from image data read out by a second readout operation of the image sensor,
wherein the image sensor performs an accumulation for image data of two or more frames read out by the second readout operation while the image sensor performs an accumulation for image data of a first frame read out by the first readout operation,
wherein the control unit generates an image in which the information indicating the area of the object detected by the detection unit among image data of a second frame which is any one of the image data of the two or more frames is superimposed on an image based on the image data of the first frame, and
wherein the image data of the second frame is image data of a frame in which an accumulation is performed at a timing closest to an exposure centroid timing of the image data of the first frame among image data of frames in which the detection unit can detect the object before the image based on the image data of the first frame is displayed on the display.

2. The imaging apparatus according to claim 1, wherein the image sensor includes a first line for outputting the image data read out by the first readout operation and a second line for outputting the image data read out by the second readout operation.

3. The imaging apparatus according to claim 2, wherein the image sensor performs the first readout operation for a pixel on the first line and performs the second readout operation for a pixel on the second line.

4. An imaging apparatus comprising:
an image sensor;
a display; and
at least one processor configured to perform operations as:
   a control unit configured to display on the display an image in which information indicating an area of an object is superimposed on an image based on image data read out by a first readout operation of the image sensor; and
   a detection unit configured to detect the object by a first method and a second method from image data read out by a second readout operation of the image sensor,
wherein the image sensor performs an accumulation for image data of two or more frames read out by the second readout operation while the image sensor performs an accumulation for image data of a first frame read out by the first readout operation,
wherein the control unit generates an image in which the information indicating the area of the object detected by the detection unit among image data of a second frame which is any one of the image data of the two or more frames is superimposed on an image based on the image data of the first frame, and
wherein the image data of the second frame is image data of a frame in which an accumulation is performed at a timing closest to an exposure centroid timing of the image data of the first frame among image data of frames in which the detection unit can detect the object by the second method before an area corresponding to the object detected by the first method in any of the image data of the two or more frames is displayed on the display among the image based on the image data of the first frame.

5. The imaging apparatus according to claim 4,
wherein the first method is a tracking detection, and the second method is a face detection.

6. A control method of an imaging apparatus including an image sensor and a display, the control method comprising:
a control step configured to display on the display an image in which information indicating an area of an object is superimposed on an image based on image data read out by a first readout operation of the image sensor; and
a detection step configured to detect the object from image data read out by a second readout operation of the image sensor,
wherein the image sensor performs an accumulation for image data of two or more frames read out by the second readout operation while the image sensor performs an accumulation for image data of a first frame read out by the first readout operation,
wherein the control step generates an image in which the information indicating the area of the object detected by the detection unit among image data of a second frame which is any one of the image data of the two or more frames is superimposed on an image based on the image data of the first frame, and
wherein the image data of the second frame is image data of a frame in which an accumulation is performed at a timing closest to an exposure centroid timing of the image data of the first frame among image data of frames in which the detection unit can detect the object before the image based on the image data of the first frame is displayed on the display.

7. A control method of an imaging apparatus including an image sensor and a display, the control method comprising:
a control step configured to display on the display an image in which information indicating an area of an object is superimposed on an image based on image data read out by a first readout operation of the image sensor; and
a detection step configured to detect the object by a first method and a second method from image data read out by a second readout operation of the image sensor, wherein the image sensor performs an accumulation for image data of two or more frames read out by the second readout operation while the image sensor performs an accumulation for image data of a first frame read out by the first readout operation, wherein the control step generates an image in which the information indicating the area of the object detected by the detection unit among image data of a second frame which is any one of the image data of the two or more frames is superimposed on an image based on the image data of the first frame, and wherein the image data of the second frame is image data of a frame in which an accumulation is performed at a timing closest to an exposure centroid timing of the image data of the first frame among image data of frames in which the detection unit can detect the object by the second method before an area corresponding to the object detected by the first method in any of the image data of the two or more frames is displayed on the display among the image based on the image data of the first frame.

\* \* \* \* \*